United States Patent
Stobbe

(10) Patent No.: US 7,843,399 B2
(45) Date of Patent: Nov. 30, 2010

(54) TEXTILE MATERIAL COMPRISING AN HF TRANSPONDER

(75) Inventor: Anatoli Stobbe, Barsinghausen (DE)

(73) Assignee: ASTRA Gesellschaft für Asset Management mbH & Co. KG, Barsinghausen (DE)

( * ) Notice: Subject to any disclaimer, the term of this patent is extended or adjusted under 35 U.S.C. 154(b) by 68 days.

(21) Appl. No.: 10/585,223

(22) PCT Filed: Jan. 14, 2005

(86) PCT No.: PCT/DE2005/000041

§ 371 (c)(1),
(2), (4) Date: Jun. 30, 2006

(87) PCT Pub. No.: WO2005/071605

PCT Pub. Date: Aug. 4, 2005

(65) Prior Publication Data

US 2007/0251207 A1    Nov. 1, 2007

(30) Foreign Application Priority Data

Jan. 22, 2004   (DE) ................. 10 2004 003 461

(51) Int. Cl.
H01Q 1/36 (2006.01)
H01Q 9/16 (2006.01)

(52) U.S. Cl. ........................ 343/897; 343/793
(58) Field of Classification Search ............... 343/897, 343/718, 793
See application file for complete search history.

(56) References Cited

U.S. PATENT DOCUMENTS

| 5,017,907 | A | 5/1991 | Cordery et al. |
| 5,049,855 | A * | 9/1991 | Slemon et al. ............... 340/550 |
| 5,906,004 | A | 5/1999 | Lebby et al. |
| 6,154,138 | A * | 11/2000 | Nilsson .................... 340/572.8 |
| 6,377,216 | B1 | 4/2002 | Cheadle et al. |
| 6,675,461 | B1 * | 1/2004 | Rowson et al. ................. 29/600 |
| 6,687,523 | B1 | 2/2004 | Jayaramen et al. |
| 6,727,197 | B1 * | 4/2004 | Wilson et al. ............... 442/301 |
| 6,766,817 | B2 | 7/2004 | da Silva |
| 6,852,395 | B2 | 2/2005 | Dhawan et al. |
| 6,918,404 | B2 | 7/2005 | da Silva |
| 7,066,586 | B2 | 6/2006 | da Silva |
| 7,285,255 | B2 | 10/2007 | Kadlec et al. |

(Continued)

FOREIGN PATENT DOCUMENTS

DE   197 55 792   6/1999

(Continued)

OTHER PUBLICATIONS

International Search Report in German language.

(Continued)

Primary Examiner—Shih-Chao Chen
(74) Attorney, Agent, or Firm—Collard & Roe, P.C.

(57) ABSTRACT

The invention relates to a textile material that comprises an HF transponder. The HF transponder comprises a circuit module and an antenna linked therewith and set to a working frequency. The antenna is configured as an E field radiator for a working frequency in the UHF or microwave range. The E field radiator is completely constituted of electrically conducting components of the textile material itself.

6 Claims, 2 Drawing Sheets

U.S. PATENT DOCUMENTS

| | | | |
|---|---|---|---|
| 7,486,252 B2 * | 2/2009 | Hiltmann et al. | 343/897 |
| 2001/0050645 A1 | 12/2001 | Boyle | |
| 2003/0085619 A1 | 5/2003 | Strache et al. | |
| 2003/0160732 A1 * | 8/2003 | Van Heerden et al. | 343/897 |
| 2007/0139201 A1 * | 6/2007 | Stobbe | 340/572.8 |
| 2007/0212281 A1 | 9/2007 | Kadlec et al. | |
| 2007/0251207 A1 | 11/2007 | Stobbe | |

FOREIGN PATENT DOCUMENTS

| | | |
|---|---|---|
| DE | 198 43 237 | 5/2000 |
| WO | WO 01/36728 A | 5/2001 |

OTHER PUBLICATIONS

Post E. R. et al: "Smart Fabric, or Wearable Clothing" Wearable Computers, 1997. Digest of Papers., First International Symposium on Cambridge, MA, USA Oct. 13-14, 1997, Los Alamitos, CA, USA, IEEE Comput. Soc, U.S., Oct. 13, 1997, pp. 167-168, XP010251560 ISBN: 0-8186-8192-6. (ISR).

Stefan Jung, et al.: "Enabling Technologies for Disappearing Electronics in Smart Textiles", 2003 IEEE International Solid-State Circuits Conference, 0-7803-7707-9/03.

Christine Kallmayer, et al.: "New Assembly Technologies for Textile Transponder Systems", 2003 Electronic Components and Technology Conference, 0-7803-7991-5/03, pp. 1123-1126.

Warrior, et al. "They Know Where You Are," IEEE Spectrum, Jul. 2003, pp. 20-25.

Marculescu, et al.: "Electronic Textiles: A Platform for Pervasive Computing," Proceedings of the IEEE, vol. 91, No. 12, Dec. 2003, pp. 1995-2018.

* cited by examiner

TEXTILE MATERIAL COMPRISING AN HF TRANSPONDER

CROSS REFERENCE TO RELATED APPLICATIONS

Applicant claims priority under 35 U.S.C. §119 of German Application No. 10 2004 003 461.3 filed Jan. 22, 2004. Applicant also claims priority under 35 U.S.C. §365 of PCT/DE2005/000041 filed Jan. 14, 2005. The international application under PCT article 21(2) was not published in English.

BACKGROUND OF THE INVENTION

1. Field of the Invention

The invention relates to a textile material with an HF transponder according to the precharacterising part of claim 1.

To identify goods during production, logistics, distribution and repair, increasingly transponders are used that in relation to legibility and data volume, as well as manipulation reliability, are superior to common barcodes. The use of transponders is also striven for in the case of textile goods; however, due to their flexible character and the necessity to clean them in hot and/or chemically corrosive media, the requirements are more stringent.

For example, a transponder must not negatively affect the intended use of textile goods; it must be resistant to thermal and chemical influences; and it must nevertheless operate so as be physically reliable.

2. Description of the Related Art

It has been known to equip textile labels with transponders that operate in the 13 MHz range. M-field radiators with coreless coils, also known as air coils, are used as antennas. The air coils can be designed in the form of conductive metal tracks on film carriers. Combinations comprising a film layer and a textile layer, e.g. as laminates, are usually incompatible with the intended use and with the process of cleaning the textile goods. Such film can become detached, partly or entirely, and/or can become damaged. However, direct integration of an air coil in a textile layer, i.e. without a film carrier, is generally problematical due to the low-ohmic and narrow-band character of a coil antenna.

However, while embroidery techniques make it possible to produce a coil from a continuous electrically conductive thread, the reproducibility of the coil geometry and the stability of this geometry during intended use of the textile goods is very poor so that the resonance frequency of the coil cannot reliably be set to the working frequency and/or cannot be held constant. Consequently the range of data transmission is shortened.

With the use of weaving techniques a reproducible and stable geometry can be achieved. However, with currently know techniques it is not possible to implement a coil antenna from a continuous electrically conductive thread in the form of a concentric spiral. Instead, warp threads and weft threads have to be multiply galvanically interconnected in order to create a coil shape in the form of a concentric spiral. The transition resistance of each of these connections increases loss and negatively affects the coil quality. Consequently the range of data transmission is also shortened.

It is the object of the invention to create a textile material with an integrated HF transponder, which makes it possible to use the textile material as an antenna that works in a physically reliable manner.

SUMMARY OF THE INVENTION

This object is met with a textile material with an HF transponder according to the precharacterising part of claim 1 by means of the features of this claim.

Improvements and advantageous embodiments are provided in the subordinate claims.

By designing the antenna as an E field radiator, also known as an electrical antenna, in the near field a larger electrical component of the alternating electromagnetic field is formed than is the case in an M field radiator. The E field radiator is thus highly resistive and is not as susceptible to materials that provide less electrical conductivity and to connections involving transition resistances. Moreover, the E field radiator operates on a broader band than an M field radiator so that larger tolerances in relation to accordance of its resonance frequency with the working frequency are permissible. The E field radiator thus makes integration in the textile material possible, as a result of which the transponder—in contrast to an embodiment as a film label with non-textile character—now assumes purely textile characteristics in relation to the antenna.

With a working frequency in the UHF range—a range between 860 MHz and 930 MHz is permissible—and in the microwave range at approximately 2400 MHz, a non-shortened half-wave radiator can be used, provided the entire area of the textile goods is available to integrate the antenna. In the case of accommodation in textile labels, at least in the UHF range an electrical extension of the mechanically shortened E field radiator is necessary in order to tune its resonance frequency to the working frequency.

The electrically conductive components of the textile material can comprise electrically conductive printing paste or electrically conductive thread constructions that can be processed by machine as part of an industrial production process that is customary with textiles.

The production in an industrial production process that is customary with textiles results in economical implementation of the E field radiator in one of the production steps that need to be carried out anyway in the production of the textile material. The same quality criteria of the textile production process thus also benefit the quality and reproducibility of the E field radiator. The E field radiator thus necessarily becomes an integral part of the textile material itself and does not in any way impede the intended use of the textile goods.

If a mechanically shortened E field radiator has to be made to resonate with the working frequency by inductances or capacitances, their geometry is compatible with the industrial production process that is customary with textiles.

In the case of E field radiators produced in printing technology this means that a geometry becomes possible that has predominantly been determined according to electrical characteristics. In this way inductances can be dimensioned with great precision and can be locally positioned where their effect is optimal. Similarly, the above also applies to the arrangement and design of capacitances.

In the case of embroidery techniques the geometry can also be matched to the electrical requirements, however, in comparison to print techniques, embroidery techniques are associated with a limitation in that the width of the conductive-thread construction cannot be changed, so that there are limitations in the design of capacitances.

Weaving techniques are associated with the largest restrictions in the geometry because the conductive-thread constructions can only extend in the direction of the warp threads and/or the weft threads. Inductances can thus not be achieved with a continuous thread.

The electrically conductive thread construction can be a metal-coated synthetic thread, a synthetic thread around which a metal wire or a stranded metal wire is wrapped, a synthetic thread with an integrated metal wire or an integrated stranded metal wire, or a graphite thread.

The selection depends on the type of electrically conductive threads that can be processed using the respective production process; the type of electrically conductive threads that provide adequate electrical conductivity characteristics; the type of contacting with connections of the circuit module; and on the type of chemical influences, if any, that are present.

According to an improvement, in the production process of weaving, inductances can be made to meander. Meandering can be achieved by a continuous electrically conductive weft thread, which between each weft extends parallel to the warp threads along a distance on the respective selvedge, which distance corresponds to the thickness of several weft threads.

Moreover, inductances can be made to meander from the combination of electrically conductive warp threads and weft threads which at their points of intersection are galvanically connected, and whose electrical conductivity is interrupted outside the meander structure. In this arrangement the galvanic connection can be stabilised by knot formation, and interruption of the electrical conductivity can individually take place on a continuous conductor or by using threads with a repeatedly interrupted conductor.

In this way during the production process of weaving, inductance can also be achieved in that a shape is used that differs from a concentric spiral.

In the production process of weaving, capacitances can be formed by adjacent electrically conductive warp threads and/or weft threads that among each other are galvanically connected and/or capacitively coupled.

In this way capacitances can be implemented and coupled in pre-calculated positions of the radiator, and their capacitance can be dimensioned.

Antenna connections between the circuit module and the radiator can be implemented by means of connections involving crimping, welding, soldering, or gluing with the use of conductive adhesive.

The connections are required because during the production process the textile material is first of all produced without the circuit module, and subsequently the circuit module has to be connected to the radiator. Crimped connections are associated with an advantage in that they establish electrical contact between the antenna connections and the radiator connections together with the attachment of the circuit module. Connection also takes place by mechanical clamping and is thus also possible between conductive materials that cannot be electrically interconnected by welding or soldering.

By means of crimped connections the circuit module can at the same time also be mechanically attached to the textile material if several threads can be enclosed that then jointly ensure the necessary tensile strength. These threads can be electrically conductive and/or non-conductive threads.

Welded connections and soldered connections can be established between conductive materials made of metals. In the case of materials that are unsuitable for crimped connections, welded connections or soldered connections, it is also possible to use glued connections with a conductive adhesive.

Preferably in the production process of printing, the printing paste itself can be the conductive adhesive. In this way printing and producing the connection between the antenna connections and the radiator connections can be implemented in directly subsequent production steps in that the antenna connections are placed into the still moist printing paste that has not hardened yet. This obviates the need for an additional adhesive.

Furthermore, the adhesive surfaces of the adhesive connections can be UV-permeable, while the conductive adhesive is UV-curable. In this way the adhesive can be brought to cure in the entire adhesive region in a very short time by UV-radiation.

Preferably the circuit module itself and its antenna connections are enclosed by a casting compound, and the casting compound is at the same time connected to the region of the textile material that is adjacent to the circuit module. In this way the casting compound fixes the circuit module to the textile material because the casting compound penetrates the depths of the textile material as a result of capillary action. Separation is only possible by way of destruction so that tampering is detectable. Furthermore, the casting compound protects the circuit module also against mechanical and chemical influences. This additional fixing-in of the antenna connections provides protection to the contacts and at the same time provides pull relief to the radiator ends, as a result of which the danger of any fractures occurring at the antenna connections of the circuit module is reduced.

The E field radiator can be designed as a symmetrical dipole or as an asymmetrical bar with a counterweight. A dipole is associated with an advantage in that the circuit module can be connected without any adaptive measures to the feed-in point, directly to opened up conductive materials. However, in the case of a non-shortened half-wave dipole, a length that corresponds to half the wavelength of the working frequency is required for arranging the radiator.

In contrast to the above, in the case of an asymmetrical bar with a counterweight, a quarter of the wavelength of the working frequency is sufficient for accommodation, provided an adequate counterweight can be implemented.

BRIEF DESCRIPTION OF THE DRAWINGS

Below, exemplary embodiments of the invention are explained with reference to the drawing.

Figure 2A:
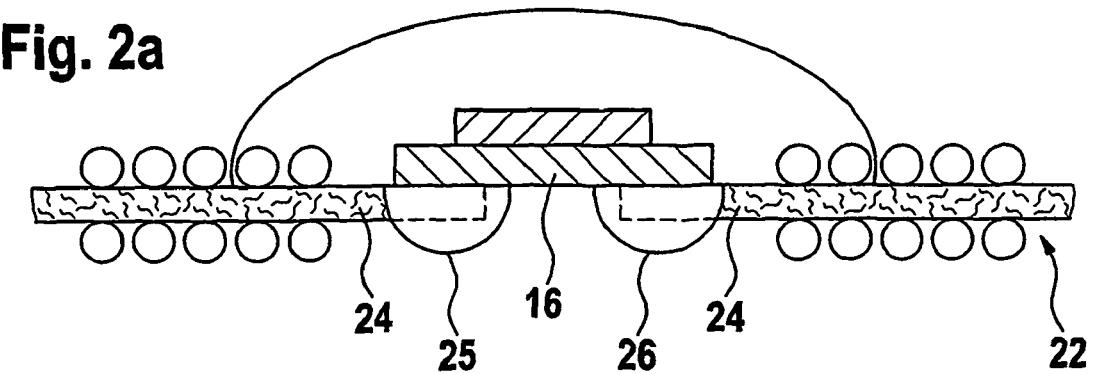
Figure 2B:
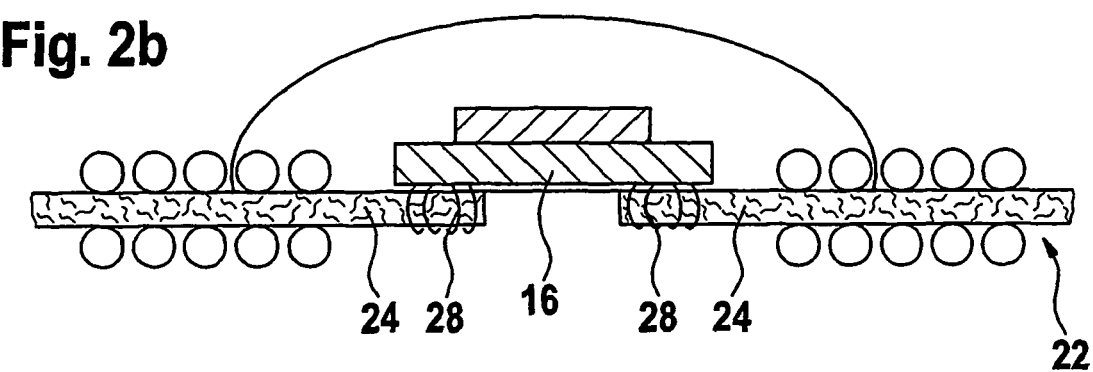
Figure 2C:
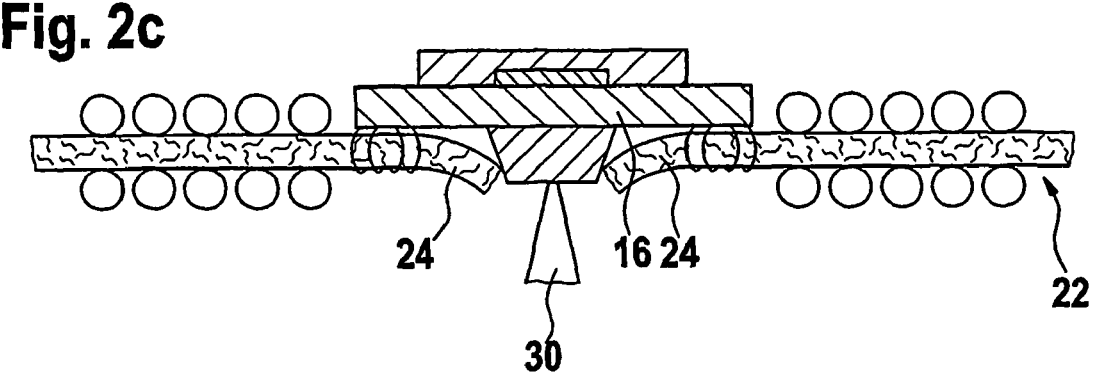
Figure 2D:
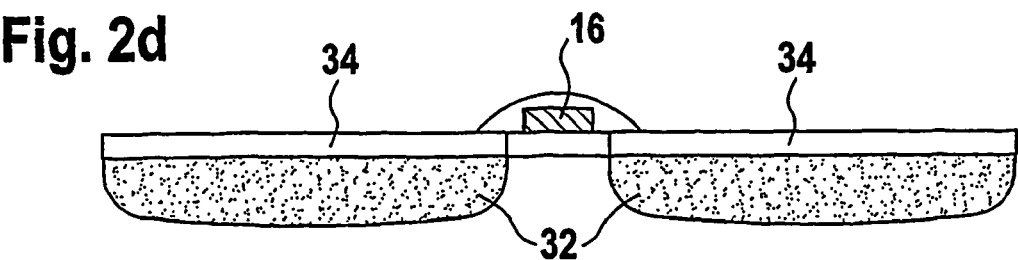

2a shows a cross section of a textile label and a circuit module with a first type of connection;

FIG. 2b show a cross section of a textile label and a circuit module with a second type of connection;

FIG. 2c show a cross section of a textile label and a circuit module with a third type of connection; and FIG. 2d show a cross section of a textile label and a circuit module with a fourth type of connection.

DETAILED DESCRIPTION OF PREFERRED EMBODIMENTS

Figure 1A:
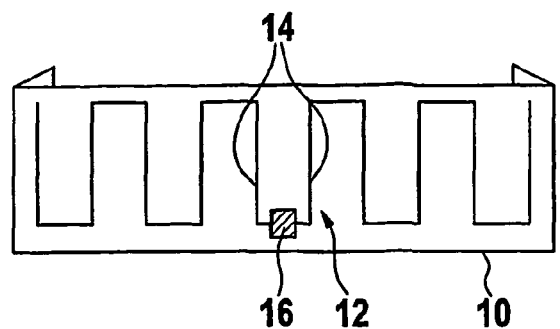
FIG. 1a show a top view of a textile label with an E field radiator of a first geometry.

FIG. 1a is a top view of a textile label 10 with a transponder 12 that comprises a dipole antenna 14 as well as a circuit module 16 connected to the dipole 14 that has been opened up in the middle. The geometric length of the dipole 14 is shortened by half the wavelength of the working frequency of the transponder 12 and is electrically extended by inductive and capacitive contents. This has been implemented by a meandering structure of the electrical conductor of the dipole antenna 14. In the case of embroidery techniques, weaving techniques or printing techniques this can be achieved by a continuous electrically conductive thread or by a continuous conductive printed track. In the case of weaving techniques this is also possible by combining electrically conductive warp threads with weft threads, wherein said threads are interconnected at points of intersection, whereas for the remainder they are electrically insulated from the other regions.

Figure 1B:
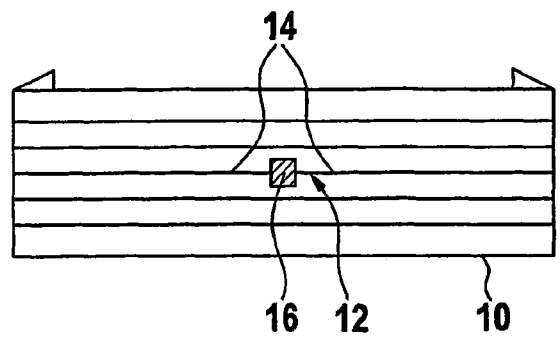
FIG. 1b shows a top view of a textile label with an E field radiator of a second geometry.

In FIG. 1b the dipole 14 is formed by a stretched electrically conductive warp thread which has been opened up in the middle where its ends are connected to connections of the circuit module 16. Laterally, further areas are capacitively coupled to this electrically conductive thread, which areas comprise continuous electrically conductive threads. They form a capacitive layer for electrically extending the dipole 14 that has been geometrically shortened by half the wavelength of the working frequency of the transponder 12.

Figure 1C:
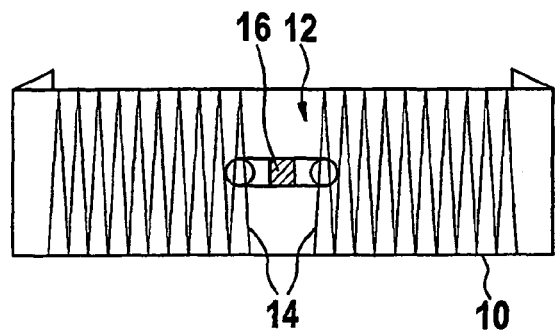
FIG. 1c show a top view of a textile label with an E field radiator of a third geometry.

In FIG. 1c the dipole 14 comprises areas of weft threads that extend parallel to each other. In a needle weaving loom a continuous weft thread is used so that the weft threads that form the electrically conductive area are all galvanically interconnected. For this reason it is only necessary in each instance to bring the connections of the circuit module 16 to the cold end of the dipole components and to galvanically connect said connections to said components.

Figure 1D:
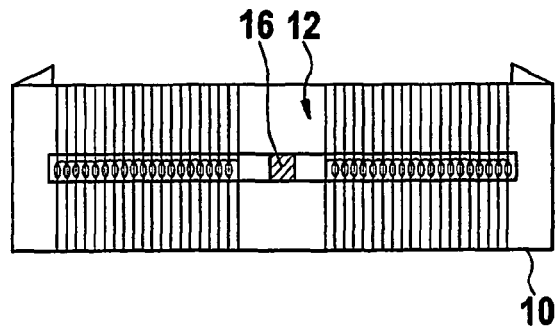
FIG. 1d show a top view of a textile label with an E field radiator of a fourth geometry.

In the dipole antenna 14 according to FIG. 1d the weft threads have been produced on a wide weaving loom, with all the weft threads having been cut at the end. The connections between the circuit module 16 and the weft threads have been established by way of electrically conductive warp threads or flexible connection lugs, and have been connected to said circuit module 16 crosswise to all weft threads of the electrically conductive area.

Figure 1E:
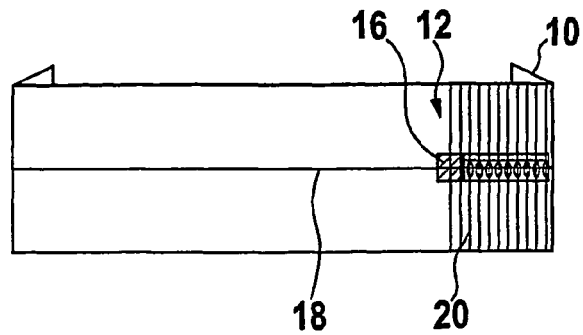
FIG. 1e show a top view of a textile label with an E field radiator of a fifth geometry.

FIG. 1e shows an asymmetrical antenna with a bar 18 in the form of an electrically conductive thread, and a counterweight 20 in the form of electrically conductive threads that extend across the above, wherein said electrically conductive threads are galvanically interconnected.

In the case of weaving techniques the local position and size of the areas of the electrically conductive threads are determined by pattern design, while in all the other techniques they are determined by corresponding preparatory stages.

FIG. 2a shows a view of a cross section of a textile material 22 and a circuit module 16 with connections to the electrically conductive threads 24 of a dipole antenna through a conductive adhesive paste 26.

In FIG. 2b crimped connections 28 are provided, which, when the circuit module 16 is inserted, mechanically clamp themselves to the electrically conductive threads 24.

FIG. 2c shows the case where the circuit module 16 is connected to a continuous conductive thread which during the connection procedure is at the same time cut by means of a cutting tool. To this effect a cutting blade is arranged on the circuit module 16, or a cutting strip is arranged to form a counterpart for a blade 30 that is moved in from the outside, or alternatively a laser cutting device is provided.

FIG. 2d finally shows the connections of the circuit module 16 to electrically conductive threads that extend crosswise, by way of an electrically conductive adhesive paste 32 that has been applied to elastic carriers 34. These can be UV-permeable materials so that curing of the adhesive by means of UV light becomes possible.

As an alternative, welded connections or soldered connections are possible, wherein spot welding, ultrasonic welding or laser welding are suitable welding techniques.

The circuit modules according to FIGS. 2a-d, including their connections, have been cast in the casting compound, and furthermore the casting compound has entered the textile material and has fixed the circuit module and also protects said circuit module against tampering.

The invention claimed is:

1. A textile material that comprises an HF transponder that comprises a circuit module and an antenna linked therewith and set to a working frequency, wherein the antenna is configured as an E field radiator for a working frequency in the UHF or microwave range, and the E field radiator is completely constituted of woven-in electrically conductive thread constructions of the textile material itself that can be processed by machine as part of an industrial production process that is customary with textiles, whereby the E field radiator is a mechanically shortened E field radiator which is made to resonate with the working frequency by inductances whose geometry is compatible with the industrial production process that is customary with textiles, and wherein in the production process of weaving, inductances are made to meander, with such meandering being achieved by a continuous electrically conductive weft thread, which between each weft extends parallel to the warp threads along a distance on the respective selvedge, which distance corresponds to the thickness of several weft threads.

2. The textile material according to claim 1, wherein the electrically conductive thread construction is a metal-coated synthetic thread, a synthetic thread around which a metal wire or a stranded metal wire is wrapped, a synthetic thread with an integrated metal wire or an integrated stranded metal wire, or a graphite thread.

3. The textile material according to claim 1, wherein antenna connections between the circuit module and the radiator can be implemented by means of connections involving crimping, welding, soldering, or gluing with the use of conductive adhesive.

4. The textile material according to claim 3, wherein adhesive surfaces of the adhesive connections are UV-permeable, and the conductive adhesive is UV-curable.

5. The textile material according to claim 1, wherein the circuit module itself and its antenna connections are enclosed by a casting compound, and the casting compound at the same time is connected to that region of the textile material, which region is adjacent to the circuit module, for mechanical attachment of the circuit module and/or for improving security against tampering.

6. The textile material according to claim 1, wherein the radiator is designed as a symmetrical dipole or as an asymmetrical bar with a counterweight.

* * * * *